US012438273B2

(12) United States Patent
Jin et al.

(10) Patent No.: US 12,438,273 B2
(45) Date of Patent: Oct. 7, 2025

(54) ANTENNA AND COMMUNICATION DEVICE

(71) Applicant: HUAWEI TECHNOLOGIES CO., LTD., Shenzhen (CN)

(72) Inventors: Li Jin, Xi'an (CN); Junfeng Lu, Xi'an (CN); Qiqiang Gao, Xi'an (CN); Xinming Liu, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 204 days.

(21) Appl. No.: 18/337,921

(22) Filed: Jun. 20, 2023

(65) Prior Publication Data

US 2023/0335905 A1 Oct. 19, 2023

Related U.S. Application Data

(63) Continuation of application No. PCT/CN2020/137913, filed on Dec. 21, 2020.

(51) Int. Cl.
*H01Q 5/50* (2015.01)

(52) U.S. Cl.
CPC .................................... *H01Q 5/50* (2015.01)

(58) Field of Classification Search
CPC .. H01Q 5/50; H01Q 3/36; H01Q 3/30; H01Q 3/32; H01Q 1/246; H01Q 1/50
See application file for complete search history.

(56) References Cited

U.S. PATENT DOCUMENTS 6,118,355 A 9/2000 Pelz et al.
2019/0273317 A1* 9/2019 Xiao ....................... H01P 1/184

FOREIGN PATENT DOCUMENTS

CN 109994809 A 7/2019
CN 110085953 A 8/2019
CN 110277611 A 9/2019
CN 209658373 U 11/2019
CN 110752423 A 2/2020
CN 111029776 A 4/2020
CN 210430115 U 4/2020
CN 212648437 U * 3/2021 .............. H01P 1/184
CN 117728130 A * 3/2024
CN 109994809 B * 6/2024
CN 110085953 B * 7/2024 .............. H01P 1/184
(Continued)

OTHER PUBLICATIONS

Extended European Search Report issued in corresponding European Application No. 20966218.8, dated Dec. 11, 2023, pp. 1-7.
(Continued)

*Primary Examiner* — Seokjin Kim
(74) *Attorney, Agent, or Firm* — HAUPTMAN HAM, LLP

(57) ABSTRACT

An antenna includes a first signal cable, a second signal cable, a combiner, a combined transmission line, a plurality of first filters and a plurality of cavities. The first signal cable is configured to transmit a first signal. Output ends of the first signal cable and the second signal cable are connected to an input end of the combined transmission line through the combiner. The plurality of first filters are each electrically connected to the first signal cable and are respectively located in at least two different cavities of the plurality of cavities. The plurality of first filters are configured to filter a second signal thereby generating the first signal.

18 Claims, 6 Drawing Sheets

(56) References Cited

FOREIGN PATENT DOCUMENTS

EP 3291362 B1 * 1/2020 ................ H01P 1/18

OTHER PUBLICATIONS

India Office Action issued in corresponding India Application No. 202327038847, dated Oct. 24, 2024, pp. 1-6.

International Search Report issued in corresponding International Application No. PCT/CN2020/137913, dated Aug. 26, 2021, pp. 1-9.

* cited by examiner

ANTENNA AND COMMUNICATION DEVICE

CROSS-REFERENCE TO RELATED APPLICATIONS

This application is a continuation of International Application No. PCT/CN2020/137913, filed on Dec. 21, 2020, the disclosure of which is hereby incorporated by reference in its entirety.

TECHNICAL FIELD

This application relates to the field of antenna technologies, and in particular, to an antenna and a communication device.

BACKGROUND

As mobile communication technologies develop, a multi-band antenna becomes increasingly important in network coverage. A combiner may combine a plurality of channels of signals with different frequencies into a same egress for output, and is usually integrated in a multi-band antenna. The multi-band antenna usually receives signals with different frequencies, and outputs the signals with different frequencies one by one from the same egress by an integrated combiner. Combiner technologies are mature and have the following mainstream forms: 1. A combiner is an independent component, a filtering and combining function is enclosed in one cavity, and the combiner is connected to another signal transmission device through a cable or in another form. 2. A combiner is directly integrated with a phase shifter or another signal transmission device, or partial integration of filtering and combining is implemented by adding a cavity. Disadvantages of these technologies are a large size and high costs, strong interference between modules, or limited space that affects performance of a filtering part.

SUMMARY

One or more embodiments of the present application provide an antenna that can reduce space and does not affect filtering performance.

According to a first aspect, an antenna is provided. The antenna includes a first signal cable, a second signal cable, a combining unit, a combined transmission line, a plurality of first filter units, and a plurality of cavities. The first signal cable is configured to transmit a first signal.

In some embodiments, output ends of the first signal cable and the second signal cable are connected to an input end of the combined transmission line through the combining unit. The plurality of first filter units are each electrically connected to the first signal cable and are respectively located in at least two different cavities. The first filter units are configured for filtering to ensure transmission quality of the first signal.

In some embodiments, the first signal cable and the second signal cable are configured to transmit signals with different frequencies. The combining unit is configured to combine the signals in the first signal cable and the second signal cable into one channel of signal, and transmit the combined signal by the combined transmission line. The first signal cable, the second signal cable, the combining unit, and the combined transmission line form a combiner. In some embodiments, the combining unit may be a metal connecting plate, a metal connector, or the like. In some embodiments, the combiner is a combiner for combining two channels of signals into one channel of signal. In some embodiments, the combiner may be a combiner for combining three and more channels of signals into one channel of signal through one cable. The first filter units may be band-stop filters or band-pass filters. A band-stop filter is a filter that can pass through most frequency components but attenuate frequency components in some ranges to an extremely low level. By adjusting a filter unit, the frequency components in some ranges are attenuated to an extremely low level. Key indicators include outband suppression, Q value, loss, in-band matching, and bandwidth. The filter unit is an equivalent LC loop, and may include a resonant cavity, a medium, an open-circuit stub, and a short-circuit stub. A band-pass filter is a filter that passes signals of some frequency components to the maximum extent by adjusting a filter unit and attenuates other signals to an extremely low level.

When the first filter units are band-pass filters, the first filter units are connected to the first signal cable. To be specific, only the first signal is allowed to pass, and another signal other than the first signal is filtered out, or a signal that is other than the first signal and that can interfere with transmission quality of the first signal is filtered out, so as to ensure the transmission quality of the first signal. In some embodiments, an end of the second signal cable is connected to an end of the first signal cable through the combining unit. A part of a second signal in the second signal cable is transmitted to the first signal cable through the combining unit, resulting in interfering with transmission stability of the first signal in the first signal cable. The first filter units are connected to the first signal cable, so that the second signal can be filtered out, thereby reducing interference of the second signal to transmission of the first signal.

In some embodiments, the plurality of first filter units are disposed in different cavities, so that a size of each of the cavities is small. In other words, the plurality of first filter units may be distributed in different cavities in the antenna without being centrally distributed in one cavity. The cavities in which the first filter units are distributed does not need to be large, and this helps reduce a size of the antenna.

In addition, the plurality of first filter units can filter out an interference signal with a wide bandwidth, or in other words, the interference signal is filtered out more completely. Moreover, in some embodiments, the cavities are cavities of the antenna. To be specific, no addition cavities are separately provided for placing the first filter units, so that costs and space of the antenna can be reduced. For example, the first filter units may be disposed in a cavity in which a phase shifter is placed, or be disposed in a cavity in which a phase compensation unit is placed. In some embodiments, the first signal cable may be understood as a signal cable that is configured to transmit the first signal and has a specific length.

In some embodiments, the plurality of cavities include a first cavity and a second cavity. A part of the first signal cable and some of the first filter units are located in the first cavity. A part of the first signal cable and some of the first filter units are located in the second cavity. Quantities of the first filter units distributed in the first cavity and the second cavity may be randomly matched, and in principle, matched and distributed in a manner of reducing space. The first signal cable is suspended in the first cavity and the second cavity. In some embodiments, there may be three or more cavities, and the plurality of first filter units are distributed in the three or more cavities.

In some embodiments, the combining unit is located in the second cavity. The combining unit may alternatively be located in the first cavity.

In some embodiments, a first through hole communicating the first cavity and the second cavity is provided on the first cavity and the second cavity, and the first signal cable passes through the first through hole, so that parts of the first signal cable are in the first cavity and the second cavity respectively. The first cavity and the second cavity are adjacently provided and share one side wall, and the first through hole is provided on the shared side wall, so that the first cavity and the second cavity can be communicated through the first through hole.

In some embodiments, a first through hole communicating the first cavity and the second cavity is provided on the first cavity and the second cavity. The antenna further includes a first signal connector. The first signal connector passes through the first through hole. Two ends of the first signal connector are respectively located in the first cavity and the second cavity and are respectively connected to the parts of the first signal cable in the first cavity and the second cavity. The first signal connector may be a pin or a metal plate. The first signal connector is electrically insulated from the first cavity and the second cavity, to prevent the first cavity and the second cavity from affecting transmission of the first signal in the first signal connector.

In some embodiments, the antenna further includes a plurality of second filter units, and at least some of the second filter units are electrically connected to the second signal cable and are located in the second cavity. The second filter units may be band-stop filters or band-pass filters. The second filter units are connected to the second signal cable. To be specific, only the second signal is allowed to pass, and another signal other than the second signal is filtered out, or another signal that can affect transmission quality of the second signal is filtered out. An end of the second signal cable is connected to an end of the first signal cable through the combining unit. A part of the first signal in the first signal cable is alternatively transmitted to the second signal cable through the combining unit, resulting in interfering with transmission stability of the second signal in the second signal cable. The second filter units are connected to the second signal cable, so that the first signal can be filtered out, thereby reducing interference of the first signal to transmission of the second signal.

In some embodiments, a quantity of the second filter units located in the second cavity is less than a quantity of the first filter units. In other words, there is a small quantity of the second filter units in the second cavity, so that there is redundant space in the second cavity for placing the first filter units.

In some embodiments, the antenna further includes a third cavity and second filter units. At least some of the second filter units are electrically connected to the second signal cable, and the some of the second filter units are located in the third cavity. The first cavity and the third cavity are provided in parallel on one side of the second cavity.

In some embodiments, a second through hole communicating the second cavity and the third cavity is provided on the second cavity and the third cavity, and the second signal cable passes through the second through hole, so that parts of the second signal cable are in the second cavity and the third cavity respectively. The second cavity and the third cavity are adjacently provided and share one side wall, and the second through hole is provided on the shared side wall, so that the second cavity and the third cavity can be communicated through the second through hole.

In some embodiments, a second signal connector is disposed on the second cavity and the third cavity. A second through hole communicating the second cavity and the third cavity is provided on the second cavity and the third cavity. The second signal connector passes through the second through hole. Two ends of the second signal connector are respectively located in the second cavity and the third cavity and are respectively connected to parts of the second signal cable in the second cavity and the third cavity. The second signal connector may be a pin or a metal plate. The second signal connector is electrically insulated from the second cavity and the third cavity, to prevent the second cavity and the third cavity from affecting transmission performance of the second signal in the second signal connector.

In some embodiments, at least some of signals filtered out by each of the second filter units have different frequencies. A bandwidth of an interference signal that is filtered out can be increased, so that impact of the interference signal can be reduced as much as possible.

In some embodiments, the antenna further includes a phase compensation unit, and the phase compensation unit is disposed in the second cavity. The phase compensation unit is configured to compensate for a phase of a signal in the combined transmission line. In some embodiments, the second cavity is a cavity configured to accommodate the phase compensation unit, to be specific, to place the first filter units by a cavity of the second cavity.

In some embodiments, the antenna further includes a first phase shifter. The first phase shifter is located in the first cavity and located at an end that is of the first signal cable and that is away from the first filter units. The first phase shifter can change a phase of a signal in the first signal cable when working. The first cavity is a cavity configured to accommodate the first phase shifter. The first phase shifter and some of the first filter units are integrated into one first cavity. To be specific, the first filter units are accommodated in a cavity that is of the antenna and that is configured to accommodate the first phase shifter, and no additional cavities need to be provided, thereby reducing a weight of the antenna and space of the antenna.

In some embodiments, the antenna further includes a second phase shifter. The second phase shifter is located in the second cavity and located at an end that is of the second signal cable and that is away from the second filter units. The second phase shifter can change a phase of a signal in the second signal cable when working. The second cavity is a cavity configured to accommodate the second phase shifter. The second phase shifter and some of the second filter units are integrated into one second cavity. To be specific, the second filter units are accommodated in a cavity that is of the antenna and that is configured to accommodate the second phase shifter, and no additional cavities need to be provided, thereby reducing a weight of the antenna and space of the antenna.

In some embodiments, at least some of signals filtered out by each of the first filter units have different frequencies. A bandwidth of an interference signal that is filtered out can be increased, so that impact of the interference signal can be reduced as much as possible.

According to a second aspect, a communication device is provided. The communication device includes the antenna in any one of the foregoing implementations.

DETAILED DESCRIPTION

Terms "first", "second", and the like in this specification are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of this application, unless otherwise stated, "a plurality of" means two or more.

In addition, in this specification, position terms such as "top" and "bottom" are defined relative to positions of structures in the accompanying drawings. It should be understood that these position terms are relative concepts used for relative description and clarification, and may correspondingly change according to changes in the positions of the structures.

For ease of understanding, the following first explains and describes English abbreviations and related technical terms used in embodiments of this application.

Q value is a quality factor of a filter.

LC loop is also referred to as a resonant circuit, a tank circuit, or a tuning circuit, and is a circuit that includes an inductor (represented by a letter L) and a capacitor (represented by a letter C) connected together.

According to an antenna provided in this application, a plurality of filter units in one signal cable of the combining unit are distributed in different cavities. In this way, a size of each of the cavities is small. In addition, the plurality of filter units can filter out an interference signal with a wide bandwidth, or in other words, an interference signal is filtered out more completely, thereby improving a filtering effect. Moreover, the cavities are cavities of the antenna, and no additional cavities are separately provided, so that costs and space of the antenna can be reduced.

Figure 1:
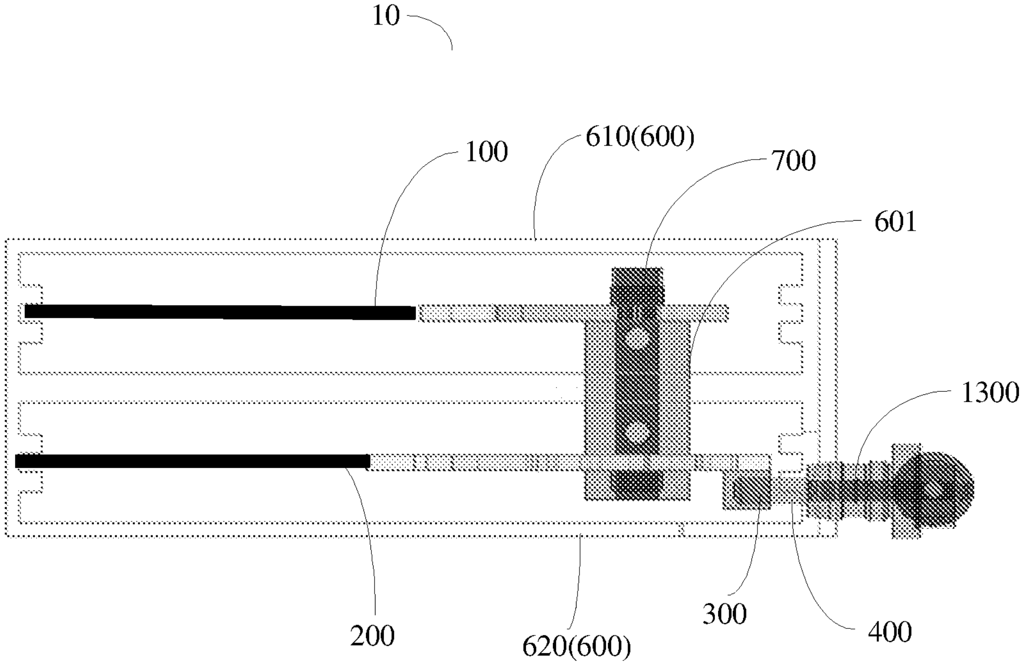
FIG. 1 is a sectional view of an antenna according to some embodiments of this application.
Figure 2:
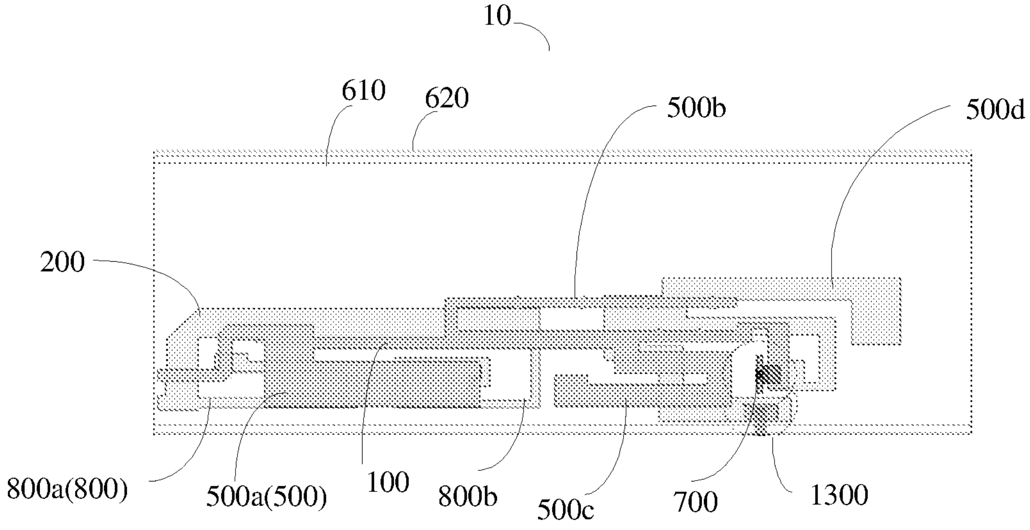
FIG. 2 is a schematic diagram of a structure of an antenna according to some embodiments of this application.
Figure 3:
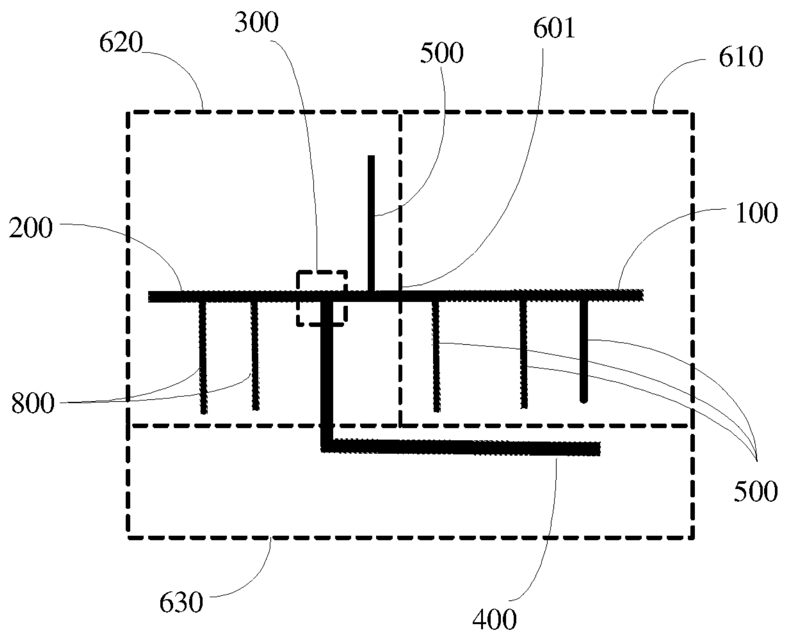
FIG. 3 is a schematic diagram of a structure of an antenna according to some embodiments of this application.
Figure 4:
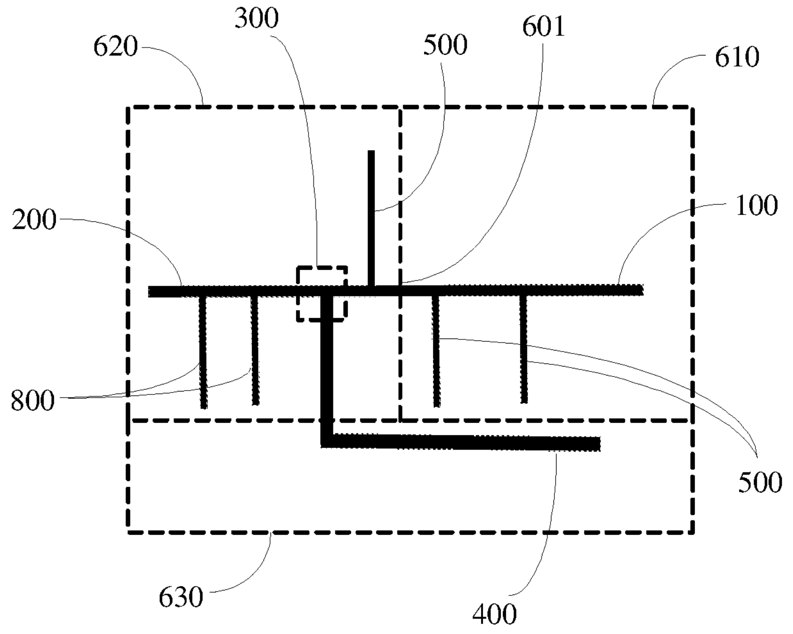
FIG. 4 is a schematic diagram of a structure of an antenna according to some embodiments of this application.

FIGS. 1-2 are side views of at least one of FIG. 3 or 4. FIG. 2 is similar to FIG. 1, but is rotated 90 degrees with respect to FIG. 1. FIG. 3 is a simplified top view of FIGS. 1 and 2. FIG. 4 is a variation of FIG. 3. Refer to FIG. 1 and FIG. 3. An implementation of this application provides an antenna 10. The antenna 10 includes a first signal cable 100, a second signal cable 200, a combining unit 300, a combined transmission line 400, a plurality of first filter units 500 (as shown in FIG. 2 and FIG. 3), and a plurality of cavities 600. The first signal cable 100 is configured to transmit a first signal. Output ends of the first signal cable 100 and the second signal cable 200 are connected to an input end of the combined transmission line 400 through the combining unit 300. The plurality of first filter units 500 are each electrically connected to the first signal cable 100. The plurality of first filter units 500 are respectively located in at least two different cavities 600. The first filter units 500 are configured for filtering to ensure transmission quality of the first signal.

The first signal cable 100 and the second signal cable 200 are configured to transmit signals with different frequencies. The combining unit 300 is configured to combine the signals in the first signal cable 100 and the second signal cable 200 into one channel of signal, and transmit the combined signal through the combined transmission line 400. The first signal cable 100, the second signal cable 200, the combining unit 300, and the combined transmission line 400 form a combiner. In some embodiments, the combining unit 300 may be a metal connecting plate, a metal connector, or the like. In some embodiments, the combiner is a combiner for combining two channels of signals into one channel of signal. In some embodiments, the combiner may be a combiner for combining three and more channels into one channel of signal through one cable. The first filter units 500 may be band-stop filters or band-pass filters. A band-stop filter is a filter that can pass through most frequency components but attenuate frequency components in some ranges to an extremely low level. By adjusting a filter unit, the frequency components in some ranges are attenuated to an extremely low level. Key indicators include outband suppression, Q value, loss, in-band matching, and bandwidth. The filter unit is an equivalent LC loop, and may include a resonant cavity, a medium, an open-circuit stub, and a short-circuit stub. In some embodiments, the first filter units 500 include open-circuit stubs (as shown in FIG. 2). A band-pass filter is a filter that passes signals of some frequency components to the maximum extent by adjusting a filter unit and attenuates other signals to an extremely low level.

In some embodiments, the first filter units 500 are band-pass filters. The first filter units 500 are connected to the first signal cable 100. To be specific, only the first signal is allowed to pass, and another signal other than the first signal is filtered out, or a signal that is other than the first signal and that can interfere with transmission quality of the first signal is filtered out, so as to ensure the transmission quality of the first signal. In this application, an end of the second signal cable 200 is connected to an end of the first signal cable 100 through the combining unit 300. A part of a second signal in the second signal cable 200 is transmitted to the first signal cable 100 through the combining unit 300, resulting in interfering with transmission stability of the first signal in the first signal cable 100. The first filter units 500 are connected to the first signal cable 100, so that the second signal can be filtered out, thereby reducing interference of the second signal to transmission of the first signal.

In this application, the plurality of first filter units 500 are disposed in different cavities 600, so that a size of each of the cavities 600 is small. In other words, the plurality of first filter units 500 may be distributed in different cavities 600 in the antenna 10 without being centrally distributed in one cavity 600. The cavities 600 in which the first filter units 500 are distributed does not need to be large, and this helps reduce a size of the antenna 10.

In addition, the plurality of first filter units 500 can filter out an interference signal with a wide bandwidth, or in other words, the interference signal is filtered out more completely. For example, when there are three first filter units

500, each of the first filter units 500 may filter out an interference signal within a frequency range of 0.2 Hz. For example, one of the first filter units 500 may filter out an interference signal with a frequency from 1.5 Hz to 1.7 Hz, one of the first filter units 500 may filter out an interference signal with a frequency from 1.7 Hz to 1.9 Hz, and one of the first filter units 500 may filter out an interference signal with a frequency from 1.9 Hz to 2.1 Hz. In this case, the three first filter units 500 may filter out interference signals of 1.5 Hz to 2.1 Hz. More first filter units 500 and wider bandwidths of interference signals that can be filtered out indicate less interference to transmission of the first signal. In addition, there is no need to increase resistance on a transmission path to eliminate resonance impact between signal cables. In other words, when bandwidths of interference signals to be filtered are the same, more first filter units 500 and a narrower width of an interference signal to be filtered by each of the first filter units 500 indicate more complete filtering of the interference signals by the first filter units 500. For example, a filtering effect when only one first filter unit 500 is used to filter out an interference signal of 1.5 Hz to 2.1 Hz is poorer than a filtering effect when three first filter units 500 are used to filter out interference signals within three different frequency ranges of 1.5 Hz to 2.1 Hz. In addition, when all of the first filter units 500 are disposed in one cavity, signal interference exists among the first filter units 500, resulting in a reduced filtering effect.

Moreover, in this application, the cavities 600 are cavities 600 of the antenna 10. To be specific, no additional cavities 600 are separately provided for placing the first filter units 500, so that costs and space of the antenna 10 can be reduced. For example, the first filter units may be disposed in a cavity 600 in which a phase shifter is placed, or be disposed in a cavity 600 in which a phase compensation unit is placed. In this application, the first signal cable 100 may be understood as a signal cable that is configured to transmit the first signal and has a specific length. For example, in a case that the antenna 10 includes a radiating element and a signal transmission port, the radiating element is configured to receive or transmit a signal, and the signal transmission port is configured to transmit a signal received from the radiating element to a remote electronic device electrically connected to the antenna 10 or is configured to transmit a signal transmitted by the remote electronic device to the antenna 10, the first signal cable 100 may be a signal cable between the signal transmission port and the radiating element.

According to the antenna 10 provided in this application, the plurality of first filter units 500 on the first signal cable 100 are distributed in different cavities 600. In this way, the cavities 600 are small, so as to help reduce a size of the antenna 10. In addition, the plurality of first filter units 500 in the different cavities 600 can filter out an interference signal with a wide bandwidth, or in other words, the interference signal is filtered out more completely, thereby improving a filtering effect. Moreover, the cavities 600 are cavities 600 of the antenna 10, and the no additional cavities 600 are separately provided for placing the first filter units 500, so that costs and space of the antenna 10 can be reduced.

In some embodiments, at least some of signals filtered out by each of the first filter units 500 have different frequencies. In some embodiments, a bandwidth of an interference signal that is filtered out can be increased, so that impact of the interference signal can be reduced as much as possible. As described above, for example, when there are three first filter units 500, each of the first filter units 500 may filter out an interference signal within a frequency range of 0.2 Hz. For example, one of the first filter units 500 may filter out an interference signal with a frequency from 1.5 Hz to 1.7 Hz, one of the first filter units 500 may filter out an interference signal with a frequency from 1.7 Hz to 1.9 Hz, and one of the first filter units 500 may filter out an interference signal with a frequency from 1.9 Hz to 2.1 Hz. In this case, the three first filter units 500 may filter out interference signals of 1.5 Hz to 2.1 Hz. More first filter units 500 and wider bandwidths of interference signals that can be filtered out indicate less interference to transmission of the first signal.

In some embodiments, the cavities 600 include a first cavity 610 and a second cavity 620 (as shown in FIG. 1 and FIG. 3). A part of the first signal cable 100 and some of the first filter units 500 are located in the first cavity 610 (as shown in FIG. 2 and FIG. 3). A part of the first signal cable 100 and some of the first filter units 500 are located in the second cavity 620. In some embodiments, there are two cavities 600, and the plurality of the first filter units 500 are distributed in the first cavity 610 and the second cavity 620. Quantities of the first filter units 500 distributed in the first cavity 610 and the second cavity 620 may be randomly matched, and in principle, matched and distributed in a manner of reducing space. In some embodiments, the first signal cable 100 is suspended in the first cavity 610 and the second cavity 620. In some embodiments, there may be three or more cavities 600, and the plurality of first filter units 500 are distributed in the three or more cavities 600.

In some embodiments, the combining unit 300 is located in the second cavity 620 (as shown in FIG. 3). To be specific, the first signal cable 100 and the second signal cable 200 are connected to the combining unit 300 in the second cavity 620. In some embodiments, the combining unit 300 may be located in the first cavity 610, and the first signal cable 100 and the second signal cable 200 are connected to the combining unit 300 in the first cavity 610.

In some embodiments, a first through hole 601 (as shown in FIG. 3) communicating the first cavity 610 and the second cavity 620 is provided on the first cavity 610 and the second cavity 620, and the first signal cable 100 passes through the first through hole 601, so that parts of the first signal cable 100 are in the first cavity 610 and the second cavity 620 respectively. In some embodiments, the first cavity 610 and the second cavity 620 are adjacently provided and share one side wall, and the first through hole 601 is provided on the shared side wall, so that the first cavity 610 and the second cavity 620 can be communicated through the first through hole 601.

In some embodiments, a first through hole 601 (as shown in FIG. 1 and FIG. 2) communicating the first cavity 610 and the second cavity 620 is provided on the first cavity 610 and the second cavity 620. The antenna 10 further includes a first signal connector 700. The first signal connector 700 passes through the first through hole 601. Two ends of the first signal connector 700 are respectively located in the first cavity 610 and the second cavity 620 and are respectively connected to parts of the first signal cable 100 in the first cavity 610 and the second cavity 620. In some embodiments, the first signal cable 100 in the first cavity 610 is electrically connected to that in the second cavity 620 through the first signal connector 700. The first signal connector 700 may be a pin or a metal plate. The first signal connector 700 is electrically insulated from the first cavity 610 and the second cavity 620, to prevent the first cavity 610 and the second cavity 620 from affecting transmission of the first signal in the first signal connector 700.

In some embodiments, the antenna 10 further includes a plurality of second filter units 800 (as shown in FIG. 2 and FIG. 3), and at least some of the second filter units 800 are electrically connected to the second signal cable 200 and located in the second cavity 620. The second filter units 800 may be band-stop filters or band-pass filters. In some embodiments, the second filter units 800 are band-pass filters. The second filter units 800 are connected to the second signal cable 200. To be specific, only the second signal is allowed to pass, and another signal other than the second signal is filtered out, or another signal that can affect transmission quality of the second signal is filtered out. An end of the second signal cable 200 is connected to an end of the first signal cable 100 through the combining unit 300. A part of the first signal in the first signal cable 100 is alternatively transmitted to the second signal cable 200 through the combining unit 300, resulting in interfering with transmission stability of the second signal in the second signal cable 200. The second filter units 800 are connected to the second signal cable 200, so that the first signal can be filtered out, thereby reducing interference of the first signal to transmission of the second signal. In embodiments shown in FIG. 2 and FIG. 3, all of the second filter units 800 are disposed in the second cavity 620. There are two second filter units 800, which are a second filter unit 800*a* and a second filter unit 800*b*. In some embodiments, the second filter units 800 may alternatively be disposed in another cavity.

In some embodiments, at least some of signals filtered out by each of the second filter units 800 have different frequencies. In some embodiments, a bandwidth of an interference signal that is filtered out can be increased, so that impact of the interference signal can be reduced as much as possible. For example, when there are two second filter units 800, each of the second filter units 800 may filter out an interference signal with a range width of 0.3 Hz. For example, one of the second filter units 800 may filter out an interference signal within a range of 2.3 Hz to 2.6 Hz, and one of the second filter units 800 may filter out an interference signal within a range of 2.6 Hz to 2.9 Hz. In this case, the two second filter units 800 may filter out interference signals of 2.3 Hz to 2.9 Hz. More second filter units 800 and wider bandwidths of interference signals that can be filtered out indicate less interference to transmission of the second signal.

In some embodiments, a quantity of the second filter units 800 located in the second cavity 620 is less than a quantity of the first filter units 500. In other words, there is a small quantity of the second filter units 800 in the second cavity 620, so that there is redundant space in the second cavity 620 for placing the first filter units 500. For example, when the first cavity 610 and the second cavity 620 have equivalent space, and there is a large quantity of the first filter units 500, some of the first filter units 500 are disposed in the second cavity 620. This makes full use of the space in the second cavity 620 and avoids impact on filtering performance caused by excessive quantity of the first filter units 500 in the first cavity 610. In an implementation, there are four first filter units 500 and two second filter units 800. Refer to FIG. 4. In some embodiments, there are three first filter units 500 and two second filter units 800.

In some embodiments, a quantity of the first filter units 500 in the second cavity 620 is less than a quantity of the first filter units 500 in the first cavity 610. In some embodiments, most of the first filter units 500 are disposed in the first cavity 610, and a small part of the first filter units 500 are disposed in the second cavity 620. For example, in some embodiments, there are four first filter units 500 (as shown in FIG. 2). Three first filter units 500 are in the first cavity 610, and one first filter unit 500 is in the second cavity 620, which are a first filter unit 500*a*, a first filter unit 500*b*, a first filter unit 500*c*, and a first filter unit 500*d*. The first filter unit 500*a*, the first filter unit 500*b*, and the first filter unit 500*c* are located in the first cavity 610. The first filter unit 500*d* is located in the second cavity 620.

Figure 5:
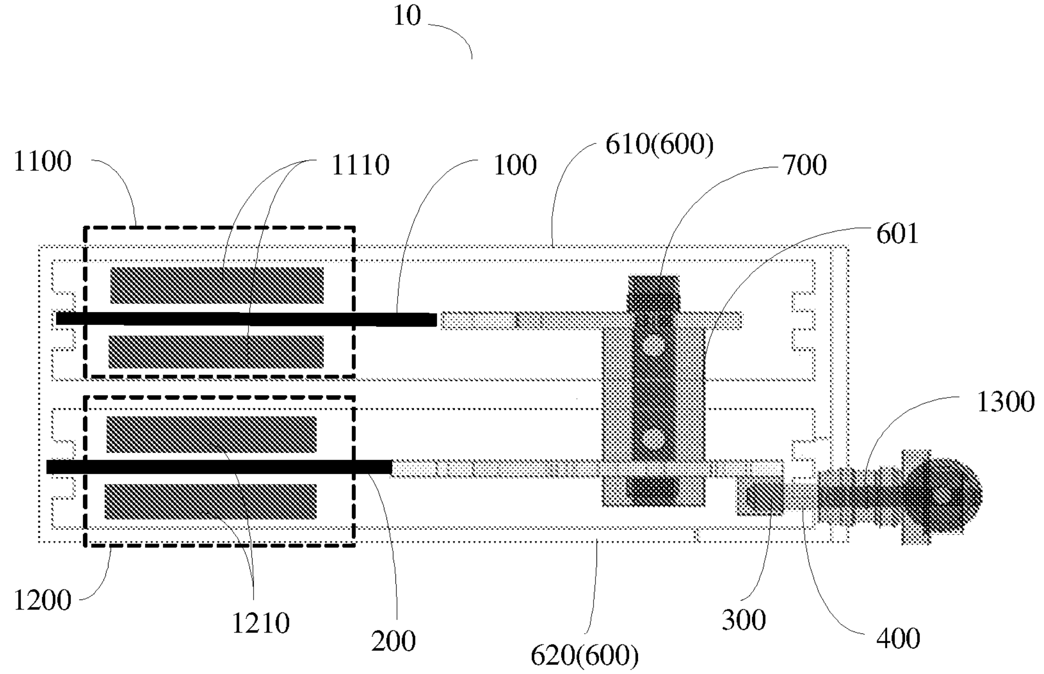
FIG. 5 is a sectional view of an antenna according to some embodiments of this application.

FIG. 5 is a variation of FIG. 1. In comparison with FIG. 1, FIG. 5 further includes at least a first phase shifter 1100. Refer to FIG. 5. In a possible implementation, the antenna 10 further includes a first phase shifter 1100. The first phase shifter 1100 is located in the first cavity 610 and located at an end that is of the first signal cable 100 and that is away from the first filter units 500. The first phase shifter 1100 can change a phase of a signal in the first signal cable 100 when working. In this implementation, the first cavity 610 is a cavity configured to accommodate the first phase shifter 1100. The first phase shifter 1100 and some of the first filter units 500 are integrated into one first cavity 610. To be specific, the first filter units 500 are accommodated in a cavity that is of the antenna 10 and that is configured to accommodate the first phase shifter 1100, and no additional cavities 600 need to be provided, thereby reducing a weight of the antenna 10 and space of the antenna 10.

The first phase shifter 1100 further includes two first dielectric portions 1110 respectively located on an upper side and a lower side of the first signal cable 100. When the first dielectric portions 1110 move, a phase in the first signal cable 100 may be changed.

In some embodiments, the antenna 10 further includes a second phase shifter 1200. The second phase shifter 1200 is located in the second cavity 620 and located at an end that is of the second signal cable 200 and that is away from the second filter units 800. The second phase shifter 1200 can change a phase of a signal in the second signal cable 200 when working. In some embodiments, the second cavity 620 is a cavity 600 configured to accommodate the second phase shifter 1200. The second phase shifter 1200 and some of the second filter units 800 are integrated into one second cavity 620. To be specific, the second filter units 800 are accommodated in a cavity that is of the antenna 10 and that is configured to accommodate the second phase shifter 1200, and no additional cavities 600 need to be provided, thereby reducing a weight of the antenna 10 and space of the antenna 10.

The second phase shifter 1200 further includes two second dielectric portions 1210 respectively located on an upper side and a lower side of the second signal cable 200. When the second dielectric portions 1210 move, a phase in the second signal cable 200 may be changed.

In some embodiments, the antenna 10 further includes a third cavity 630 (as shown in FIG. 3 and FIG. 4) and a third signal connector 1300 (as shown in FIG. 1). The first cavity 610 and the second cavity 620 are provided in parallel on one side of the third cavity 630. The third signal connector 1300 is disposed between the second cavity 620 and the third cavity 630. Parts of the combined transmission line 400 are located in the second cavity 620 and the third cavity 630. The parts of the combined transmission line 400 in the second cavity 620 and the third cavity 630 are connected through the third signal connector 1300. The third signal connector 1300 may be a pin or a connecting plate. The third signal connector 1300 is electrically insulated from the second cavity 620 and the third cavity 630.

Figure 6:
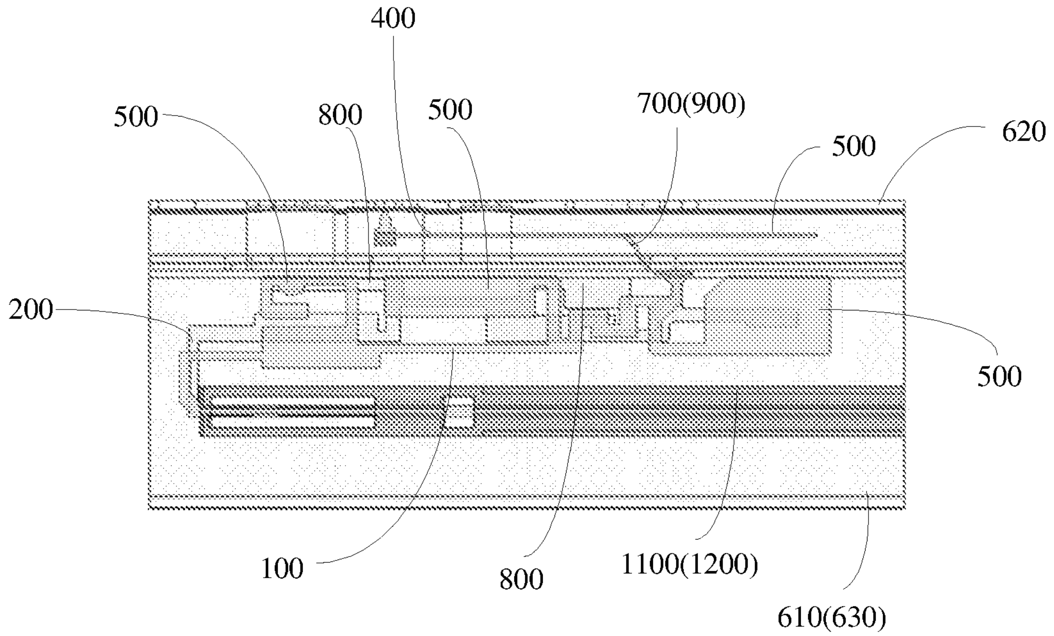
FIG. 6 is a schematic diagram of a structure of an antenna according to some embodiments of this application.
Figure 7:
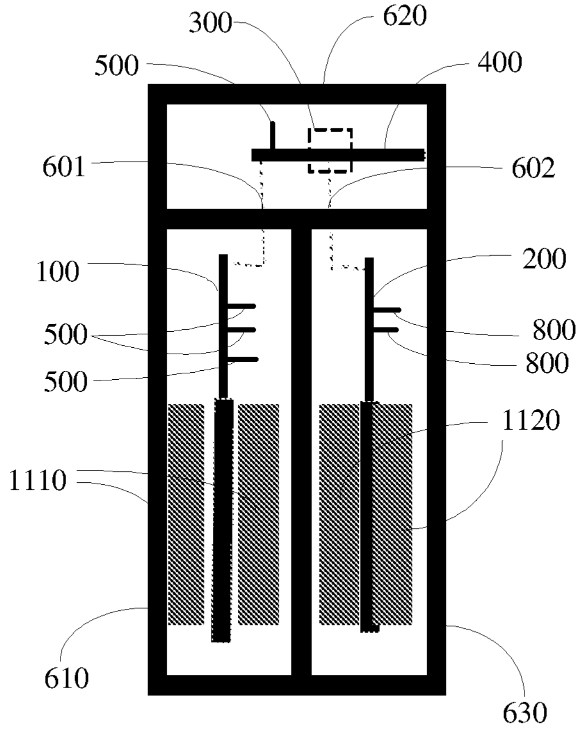
FIG. 7 is a schematic diagram of a structure of an antenna according to some embodiments of this application.

FIG. 6 is a variation of FIG. 2. In comparison with FIG. 2, FIG. 6 further includes at least a third cavity 630 and second filter units 800. FIG. 6 is a side view. FIG. 7 is a simplified top view of FIG. 6. Refer to FIG. 6 and FIG. 7. In a possible implementation, the antenna 10 further includes a third cavity 630 and second filter units 800. At least some of the second filter units 800 are electrically connected to the second signal cable 200, and the some of the second filter units 800 are located in the third cavity 630. In this implementation, at least some of the second filter units 800 are located in the third cavity 630. The combining unit 300 is located in the second cavity 620. Output ends of the first signal cable 100 and the second signal cable 200 and an input end of the combined transmission line 400 are located in the second cavity 620. To be specific, the first signal cable 100 and the second signal cable 200 respectively pass through the first cavity 610 and the third cavity 630, and then are combined in the second cavity 620. In this implementation, the first cavity 610 and the third cavity 630 are provided in parallel on one side of the second cavity 620. Refer to FIG. 7. In this implementation, all of the second filter units 800 are located in the third cavity 630. The second signal cable 200 is processed by the second filter units 800 in the third cavity 630, and then enters the second cavity 620 for combination with the first signal cable 100.

In some embodiments, a second through hole 602 (as shown in FIG. 7) communicating the second cavity 620 and the third cavity 630 is provided on the second cavity 620 and the third cavity 630, and the second signal cable 200 passes through the second through hole 602, so that parts of the second signal cable 200 are in the second cavity 620 and the third cavity 630 respectively. In some embodiments, the second cavity 620 and the third cavity 630 are adjacently provided and share one side wall, and the second through hole 602 is provided on the shared side wall, so that the second cavity 620 and the third cavity 630 can be communicated through the second through hole 602.

In some embodiments, a second signal connector 900 (as shown in FIG. 6) is disposed on the second cavity 620 and the third cavity 630. A second through hole (not shown in FIG. 6) communicating the second cavity 620 and the third cavity 630 is provided on the second cavity 620 and the third cavity 630. The second signal connector 900 passes through the second through hole. Two ends of the second signal connector 900 are respectively located in the second cavity 620 and the third cavity 630 and are respectively connected to the parts of the second signal cable 200 in the second cavity 620 and the third cavity 630. In some embodiments, the second signal cable 200 in the second cavity 620 is electrically connected to that in the third cavity 630 through the second signal connector 900. The second signal connector 900 may be a pin or a metal plate. The second signal connector 900 is electrically insulated from the second cavity 620 and the third cavity 630, to prevent the second cavity 620 and the third cavity 630 from affecting transmission performance of the second signal in the second signal connector 900.

Figure 8:
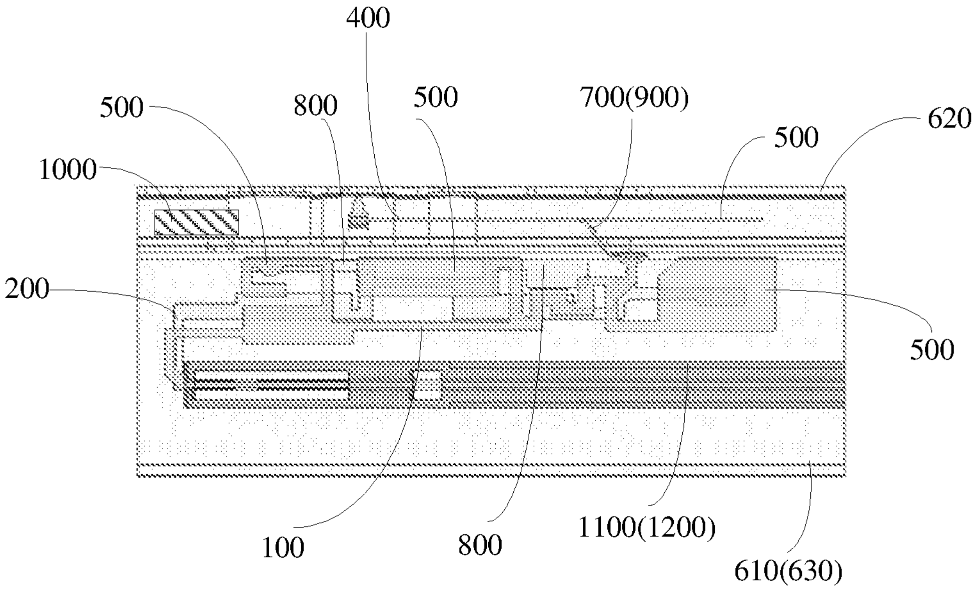
FIG. 8 is a schematic diagram of a structure of an antenna according to some embodiments of this application.

Refer to FIG. 8. In some embodiments, the antenna 10 further includes a phase compensation unit 1000, and the phase compensation unit 1000 is disposed in the second cavity 620. The phase compensation unit 1000 is configured to compensate for a phase of a signal in the combined transmission line 400. In this application, the second cavity 620 is a cavity 600 configured to accommodate the phase compensation unit 1000, to be specific, to place the first filter units 500 by a cavity of the second cavity.

Figure 9:
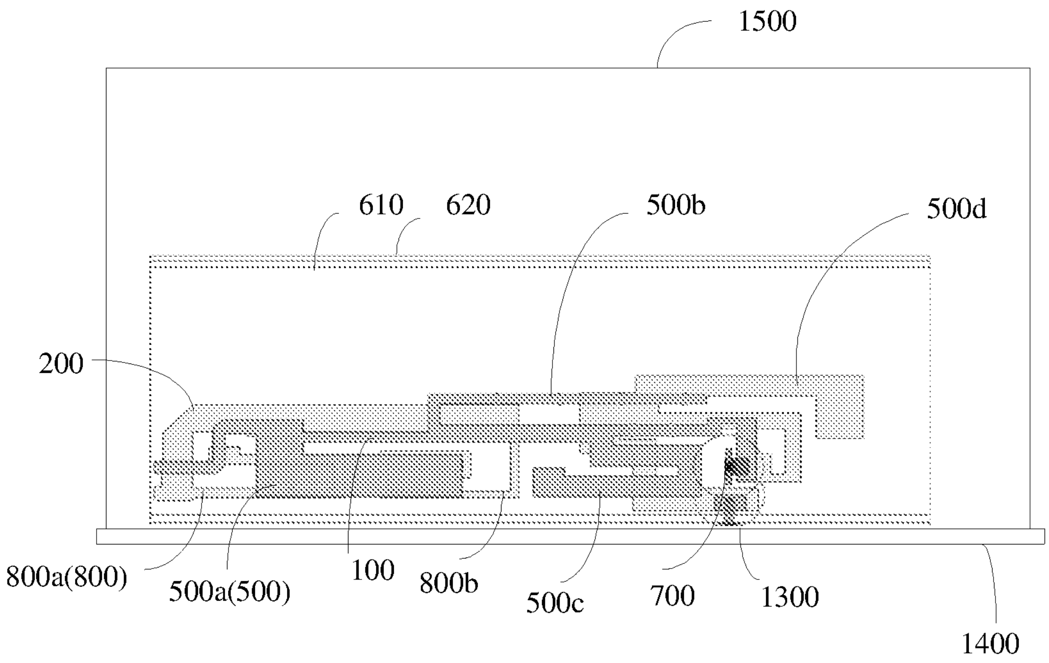
FIG. 9 is a schematic diagram of a structure of an antenna according to some embodiments of this application.

Refer to FIG. 9. In some embodiments, the antenna 10 further includes a reflection panel 1400 and a radome 1500. The cavities 600 and components of the cavities 600 are located between the reflection panel 1400 and the radome 1500. In some embodiments, the cavities 600, the first signal cable 100, the second signal cable 200, the combining unit 300, and the combined transmission line 400 are a part of a feeding network in the antenna 10. The feeding network further includes a phase-shifting and power division unit, a radiating element, and the like. The reflection panel 1400 is configured to reflect a signal, improve sensitivity of receiving a signal by the antenna 10, and reflect and aggregate the signal on a receiving point of the antenna 10. This greatly enhances a receiving/transmitting capability of the antenna 10, and blocks or shields interference of other electromagnetic waves from a back side of the reflection panel 1400 to the signal. A material of the reflection panel 1400 may be metal. The radome 1500 has a good electromagnetic wave penetration characteristic, and can withstand an external harsh environment, thereby protecting the antenna 10 from affecting by an external environment. In some embodiments, the cavities 600 include the first cavity 610 and the second cavity 620.

Figure 10:
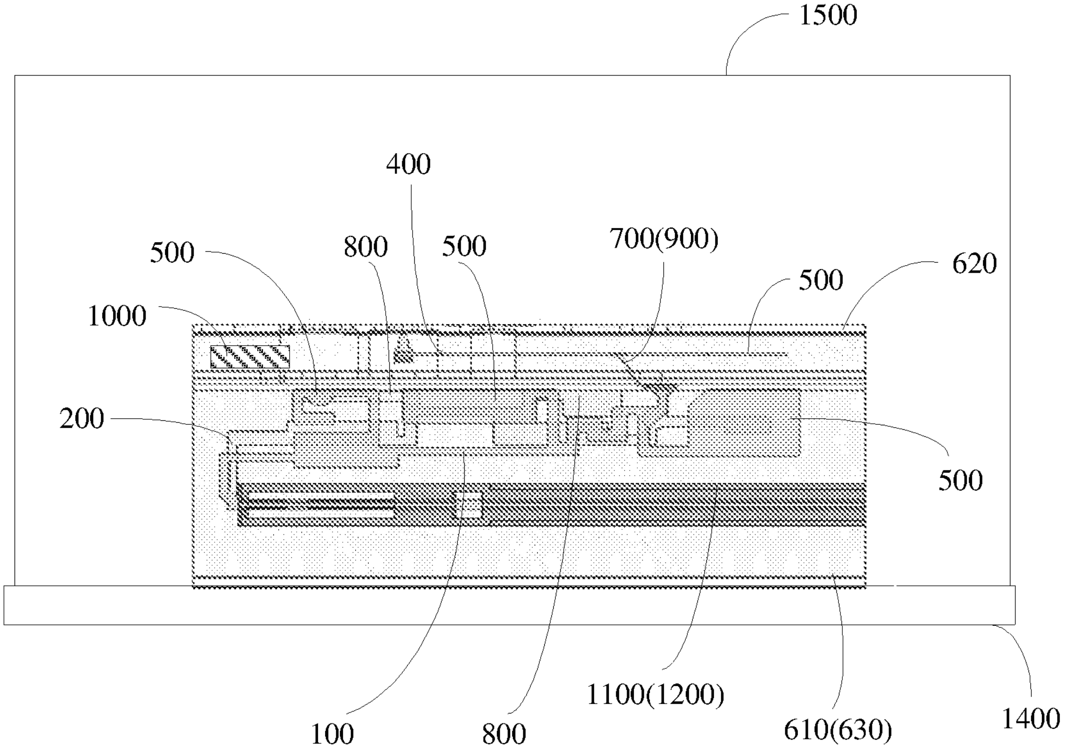
FIG. 10 is a schematic diagram of a structure of an antenna according to some embodiments of this application.

Refer to FIG. 10. In some embodiments, the first cavity 610, the second cavity 620, the third cavity 630, and components in the three cavities 600 are located between the reflection panel 1400 and the radome 1500.

In some embodiments, the cavities 600 are formed on the reflection panel 1400, or in other words, one side of the cavities 600 is functioned as the reflection panel 1400 of the antenna 10.

It should be noted that the foregoing implementations are described by using a combiner in which two channels of signals are combined into one channel of signal as an example. For a combiner in which three or more channels of signal are combined into one channel of signal, mutual interference between signals also exists in the combiner, and a corresponding variation may also be made by using a principle of this application.

Figure 11:
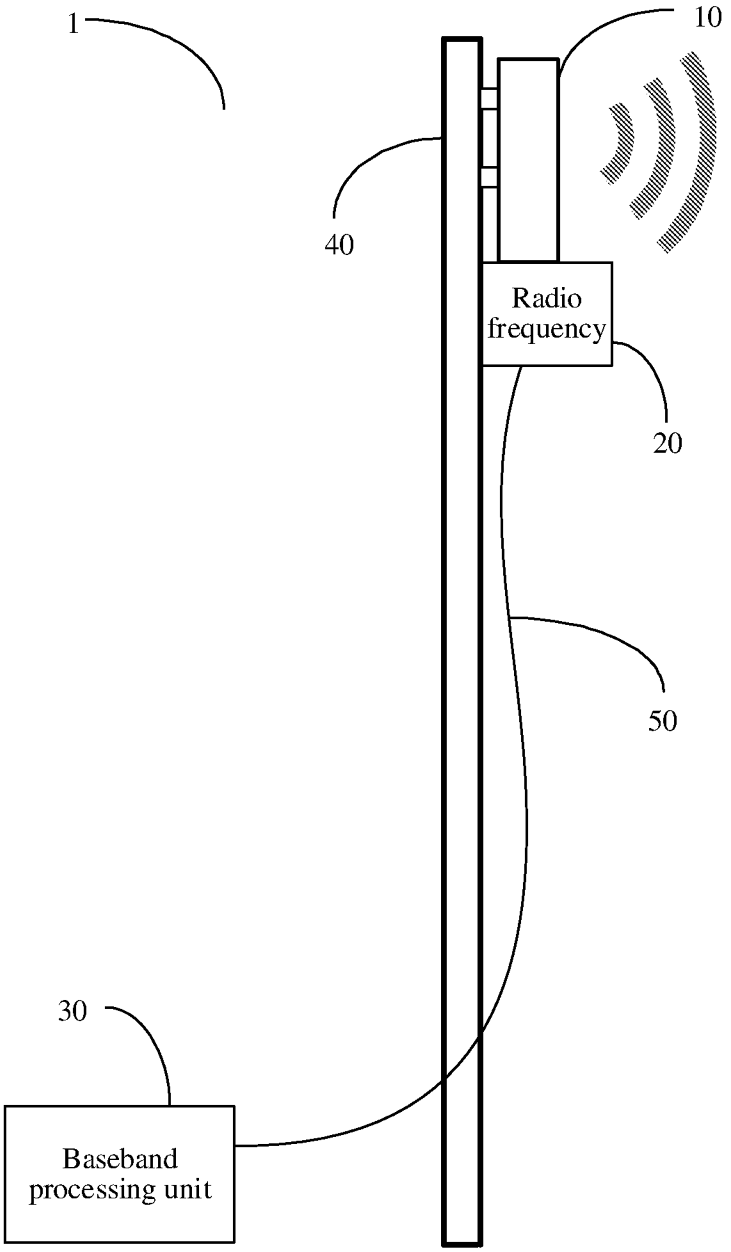
FIG. 11 is a schematic diagram of a structure of a communication device according to some embodiments of this application.

Refer to FIG. 11. An implementation of this application further provides a communication device 1, including the antenna 10 in any one of the foregoing implementations. There may be a plurality of antennas 10. The plurality of antennas 10 are distributed in an array. Each of the antennas 10 has a feeding network. The feeding network in each of the antennas 10 may correspond to different frequencies. Same frequencies in the antennas 10 correspond to different radiation directions.

In some embodiments, the communication device 1 further includes a radio frequency processing unit 20 and a baseband processing unit 30. The baseband processing unit 30 is connected to the feeding network in the antenna 10 through the radio frequency processing unit 20. The antenna 10 is configured to transmit a received radio signal to the radio frequency processing unit 20, or convert a transmit signal of the radio frequency processing unit 20 into an electromagnetic wave, and send the electromagnetic wave. The radio frequency processing unit 20 is configured to perform frequency selection, amplification, down conversion processing on the radio signal received by the antenna 10, and convert the processed radio signal into an intermediate frequency signal or a baseband signal and send the intermediate frequency signal or the baseband signal to the baseband processing unit 30, or is configured to perform up conversion and amplification on the baseband signal or the intermediate frequency signal sent by the baseband processing unit 30, and send the amplified baseband signal or the intermediate frequency signal through the antenna. The baseband processing unit 30 is configured to process the intermediate frequency signal or the baseband signal sent by the radio frequency processing unit 20.

In an implementation, the radio frequency processing unit 20 and the antenna 10 are disposed integrally, and the antenna 10 is installed on a pole 40 or a tower. The radio frequency processing unit 20 and the antenna 10 are disposed integrally, and the baseband processing unit 30 is located at a remote end of the antenna 10 and is connected to the radio frequency processing unit 20 through a cable 50. In some embodiments, the radio frequency processing unit 20 and the baseband processing unit 30 may be located at a remote end of the antenna 10 at the same time.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An antenna, comprising:
a first signal cable,
a second signal cable,
a combiner,
a combined transmission line,
a plurality of first filters, and
a plurality of cavities,
wherein the first signal cable is configured to transmit a first signal, output ends of the first signal cable and the second signal cable are connected to an input end of the combined transmission line through the combiner, the plurality of first filters are each electrically connected to the first signal cable and are respectively located in at least two different cavities of the plurality of cavities, and the plurality of first filters are configured to filter a second signal thereby generating the first signal,
wherein the plurality of cavities comprise:
a first cavity, and
a second cavity,
wherein a first part of the first signal cable and a first part of the plurality of the first filters are located in the first cavity, and
a second part of the first signal cable and a second part of the plurality of the first filters are located in the second cavity.

2. The antenna according to claim 1, wherein the combiner is located in the second cavity.

3. The antenna according to claim 2, wherein
a first through hole communicating with the first cavity and the second cavity is on the first cavity and the second cavity, and
the first signal cable protrudes through the first through hole, and the first part of the first signal cable and the second part of the first signal cable are in the first cavity and the second cavity, respectively.

4. The antenna according to claim 2, wherein
a first through hole communicating with the first cavity and the second cavity is on the first cavity and the second cavity,
the antenna further comprises:
a first signal connector, the first signal connector protrudes through the first through hole, and two ends of the first signal connector are respectively located in the first cavity and the second cavity, and are respectively connected to the first part of the first signal cable and the second part of the first signal cable in the first cavity and the second cavity.

5. The antenna according to claim 1, wherein the antenna further comprises:
a plurality of second filters, and
at least a first part of the second filters are electrically connected to the second signal cable, and are located in the second cavity.

6. The antenna according to claim 5, wherein a quantity of the second filters located in the second cavity is less than a quantity of the first filters.

7. The antenna according to claim 1, wherein the antenna further comprises:
a third cavity, and
a plurality of second filters,
wherein at least a first part of the plurality of second filters is electrically connected to the second signal cable, and the first part of the plurality of second filters is located in the third cavity.

8. The antenna according to claim 7, wherein
a second through hole communicating with the second cavity and the third cavity is on the second cavity and the third cavity, and
the second signal cable protrudes through the second through hole, and a first part of the second signal cable and a second part of the second signal cable are in the second cavity and the third cavity, respectively.

9. The antenna according to claim 7, wherein
the antenna further comprises:
a second signal connector, the second signal connector is disposed on the second cavity and the third cavity,
a second through hole communicating with the second cavity and the third cavity is on the second cavity and the third cavity, the second signal connector protrudes through the second through hole, and two ends of the second signal connector are respectively located in the second cavity and the third cavity, and are respectively connected to a first part of the second signal cable and a second part of the second signal cable in the second cavity and the third cavity.

10. The antenna according to claim 7, wherein a first filter of the plurality of second filters and a second filter of the plurality of second filters are configured to filter signals with different corresponding frequencies.

11. The antenna according to claim 1, wherein the antenna further comprises:
a phase compensator, and the phase compensator is disposed in the second cavity.

12. The antenna according to claim 1, wherein the antenna further comprises:
a first phase shifter located in the first cavity, located at an end of the first signal cable, and fails to be adjacent to the plurality of the first filters, and the first phase shifter is configured to change a phase of a signal in the first signal cable.

13. The antenna according to claim 12, wherein the antenna further comprises:
a second phase shifter is located in the second cavity, located at an end of the second signal cable, and fails to be adjacent to the plurality of the second filters, and the second phase shifter is configured to change a phase of a signal in the second signal cable.

14. The antenna according to claim 1, wherein
a first filter of the plurality of first filters and a second filter of the plurality of first filters are configured to filter signals with different corresponding frequencies.

15. A communication device, comprising an antenna; wherein the antenna comprises:

a first signal cable, a second signal cable, a combiner, a combined transmission line, a plurality of first filters, and a plurality of cavities, wherein the first signal cable is configured to transmit a first signal, output ends of the first signal cable and the second signal cable are connected to an input end of the combined transmission line through the combiner, the plurality of first filters are each electrically connected to the first signal cable and are respectively located in at least two different cavities of the plurality of cavities, and the plurality of first filters are configured to filter a second signal thereby generating the first signal, wherein the plurality of cavities comprise:

a first cavity, and a second cavity, wherein a first part of the first signal cable and a first part of the plurality of the first filters are located in the first cavity, and a second part of the first signal cable and a second part of the plurality of the first filters are located in the second cavity.

16. The communication device according to claim 15, wherein the combiner is located in the second cavity.

17. The communication device according to claim 16, wherein a first through hole communicating with the first cavity and the second cavity is on the first cavity and the second cavity, and the first signal cable protrudes through the first through hole, and the first part of the first signal cable and the second part of the first signal cable are in the first cavity and the second cavity, respectively.

18. The communication device according to claim 16, wherein a first through hole communicating with the first cavity and the second cavity is on the first cavity and the second cavity, the antenna further comprises:

a first signal connector, the first signal connector protrudes through the first through hole, and two ends of the first signal connector are respectively located in the first cavity and the second cavity, and are respectively connected to the first part of the first signal cable and the second part of the first signal cable in the first cavity and the second cavity.

* * * * *